(12) United States Patent
Murakawa

(10) Patent No.: US 9,730,007 B2
(45) Date of Patent: Aug. 8, 2017

(54) COMMUNICATION DEVICE, COMMUNICATION SYSTEM, AND RECORDING MEDIUM

(71) Applicant: KONICA MINOLTA, INC., Chiyoda-ku, Tokyo (JP)

(72) Inventor: Akira Murakawa, Toyonaka (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/271,774

(22) Filed: Sep. 21, 2016

(65) Prior Publication Data
US 2017/0094449 A1 Mar. 30, 2017

(30) Foreign Application Priority Data

Sep. 25, 2015 (JP) .................................. 2015-188847

(51) Int. Cl.
 H04W 4/00 (2009.01)
 H04W 76/02 (2009.01)
 H04W 24/08 (2009.01)
(52) U.S. Cl.
 CPC ........... *H04W 4/008* (2013.01); *H04W 24/08* (2013.01); *H04W 76/023* (2013.01)
(58) Field of Classification Search
 CPC combination set(s) only.
 See application file for complete search history.

(56) References Cited

U.S. PATENT DOCUMENTS

| | | | | |
|---|---|---|---|---|
| 6,687,793 | B1 * | 2/2004 | Thomas | G06F 12/0866 711/100 |
| 2009/0210573 | A1 * | 8/2009 | Yudenfriend | G06F 13/12 710/19 |
| 2012/0293819 | A1 * | 11/2012 | Doui | H04L 63/083 358/1.13 |
| 2013/0052954 | A1 * | 2/2013 | Avadhanam | H04W 4/008 455/41.2 |
| 2013/0221084 | A1 * | 8/2013 | Doss | H04W 12/06 235/375 |

(Continued)

FOREIGN PATENT DOCUMENTS

JP 2015106371 A 6/2015

*Primary Examiner* — Cindy Trandai
(74) *Attorney, Agent, or Firm* — Holtz, Holtz & Volek PC

(57) ABSTRACT

A communication device capable of performing wireless communication measures an actual time from a first timing (at which a communication request instructing to perform communication with a specific device is informed from an application program on the communication device to an OS (Operating System) on the communication device) to a second timing (at which reply information in response to the communication request is informed from the OS to the application program). When the actual time is greater than a predetermined threshold, the communication device determines that an associating process has been performed by the OS in a specific period from the first timing to the second timing, the associating process previously registering the communication device and the specific device in association with each other. When the actual time is smaller than the predetermined threshold, the communication device determines that the associating process has not been performed in the specific period.

15 Claims, 14 Drawing Sheets

(56) References Cited

U.S. PATENT DOCUMENTS

| | | | |
|---|---|---|---|
| 2013/0229690 A1* | 9/2013 | Sumita | H04N 1/00127 358/1.15 |
| 2014/0256256 A1* | 9/2014 | Park | H04W 36/14 455/41.1 |
| 2014/0324949 A1* | 10/2014 | Satomi | H04L 65/1069 709/203 |

* cited by examiner

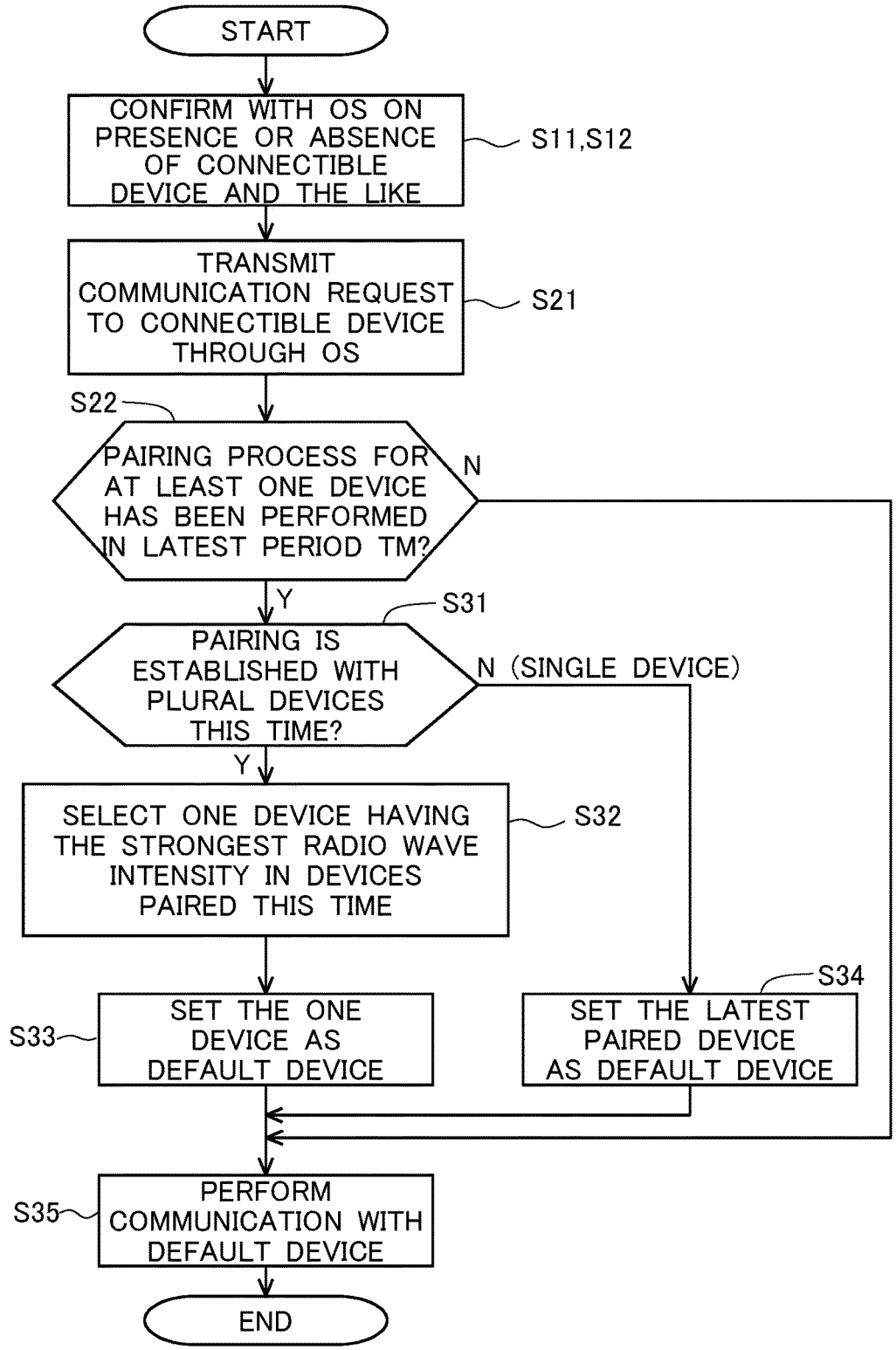

COMMUNICATION DEVICE, COMMUNICATION SYSTEM, AND RECORDING MEDIUM

This application is based on Japanese Patent Application No. 2015-188847 filed on Sep. 25, 2015, the contents of which are hereby incorporated by reference.

BACKGROUND OF THE INVENTION

Field of the Invention

The present invention relates to a communication device and a technology related to the communication device.

Description of the Background Art

In one technology, a pairing process (an associating process to previously register communication devices in association with each other) is performed between communication devices (see Japanese Patent Application Laid-Open No. 2015-106371).

For example, in a wireless connection with the Bluetooth (registered trade mark) standard, an associating process (pairing process) is performed to previously register communication partners in association with each other (in advance to normal communication). Note that if a pairing process is performed at the first communication or the like, a pairing process is basically not necessary in the following communication (the communication at the second time or after or other communications).

In one OS (for example, iOS, which is an operating system of Apple Inc.), a pairing function related to the wireless connection using the Bluetooth (registered trade mark) system is provided as a part of the functions of the OS (operating system). This pairing process itself is not performed by an application program (hereinafter, simply referred to as an application, too) but is performed by the OS (in more detail, by the OS called in response to a communication request from the application).

However, the application which has requested the OS to issue the communication request cannot obtain, directly from the OS, information about whether the pairing process has been performed in the communication of this time (the communication in response to the communication request). That is, it is difficult for the application to know the presence or absence of the pairing process.

More specifically, in the case where normal communication is possible through the wireless connection using the Bluetooth system, it is impossible for the application to distinguish that the normal communication could be started due to the pairing process performed immediately before the normal communication from that the normal communication could be communication due to the pairing process already performed long before the normal communication. In short, the application cannot distinguish that the short-range wireless communication connection is being performed immediately after the "first pairing process" from that the short-range wireless communication connection is being performed after the "pairing process completed long before".

Because of the above issue, it is difficult for the application to reflect the presence or absence of execution of the pairing process on the various succeeding processes.

Such a problem can occur not only to the communication connection using the Bluetooth but also to the communication connection using other methods.

SUMMARY OF THE INVENTION

An object of the present invention is to provide a technology with which an application program on a communication device easily gets to know the presence or absence of the execution of a process (pairing process or the like) for previously associating communication partner devices in a wireless communication with each other.

A first aspect of the present invention is a communication device capable of performing wireless communication by a specific method. The communication device includes: a time measuring unit which measures an actual time from a first timing to a second timing, the first timing being a timing at which a communication request instructing to perform communication, with a specific device, by the specific method is informed from an application program on the communication device to an operating system on the communication device, the second timing being a timing at which reply information in response to the communication request is informed from the operating system to the application program; and a determination unit which determines whether an associating process relating to the wireless communication by the specific method has been performed by the operating system in a specific period from the first timing to the second timing, the associating process previously registering the communication device and the specific device in association with each other. When the actual time is greater than a predetermined threshold, the determination unit determines that the associating process has been performed in the specific period, and when the actual time is smaller than the predetermined threshold, the determination unit determines that the associating process has not been performed in the specific period.

A second aspect of the present invention is a non-transitory computer-readable recording medium storing an application program for causing a computer built in a communication device capable of performing wireless communication by a specific method to execute: (a) measuring an actual time from a first timing to a second timing, the first timing being a timing at which a communication request instructing to perform communication with a specific device by the specific method is informed from an application program on the communication device to an operating system on the communication device, the second timing being a timing at which reply information in response to the communication request is informed from the operating system to the application program; and (b) determining whether an associating process relating to the wireless communication by the specific method has been performed by the operating system in a specific period from the first timing to the second timing, the associating process previously registering the communication device and the specific device in association with each other. In step (b), when the actual time is greater than a predetermined threshold, it is determined that the associating process has been performed in the specific period, and when the actual time is smaller than the predetermined threshold, it is determined that the associating process has not been performed in the specific period.

A third aspect of the present invention is a communication system including: a first communication device: and at least one communication destination device which is a communication destination of the first communication device. The first communication device is a communication device which can perform wireless communication by a specific method, and the first communication device includes: a time measuring unit which measures an actual time from a first timing to a second timing, the first timing being a timing at which a communication request instructing to perform communication with a specific device by the specific method is informed from an application program on the communication device to an operating system on the communication device, the second timing being a timing at which reply information in response to the communication request is informed from the operating system to the application program; and a determination unit which determines whether an associating process relating to the wireless communication by the specific method has been performed by the operating system in a specific period from the first timing to the second timing, the associating process previously registering the communication device and the specific device in association with each other. When the actual time is greater than a predetermined threshold, the determination unit determines that the associating process has been performed in the specific period, and when the actual time is smaller than the predetermined threshold, the determination unit determines that the associating process has not been performed in the specific period.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a flowchart showing an operation in the second embodiment.

DESCRIPTION OF THE PREFERRED EMBODIMENTS

Hereinafter, embodiments of the present invention will be described with reference to the drawings.

1. First Embodiment

1-1. Configuration Outline

Figure 1:
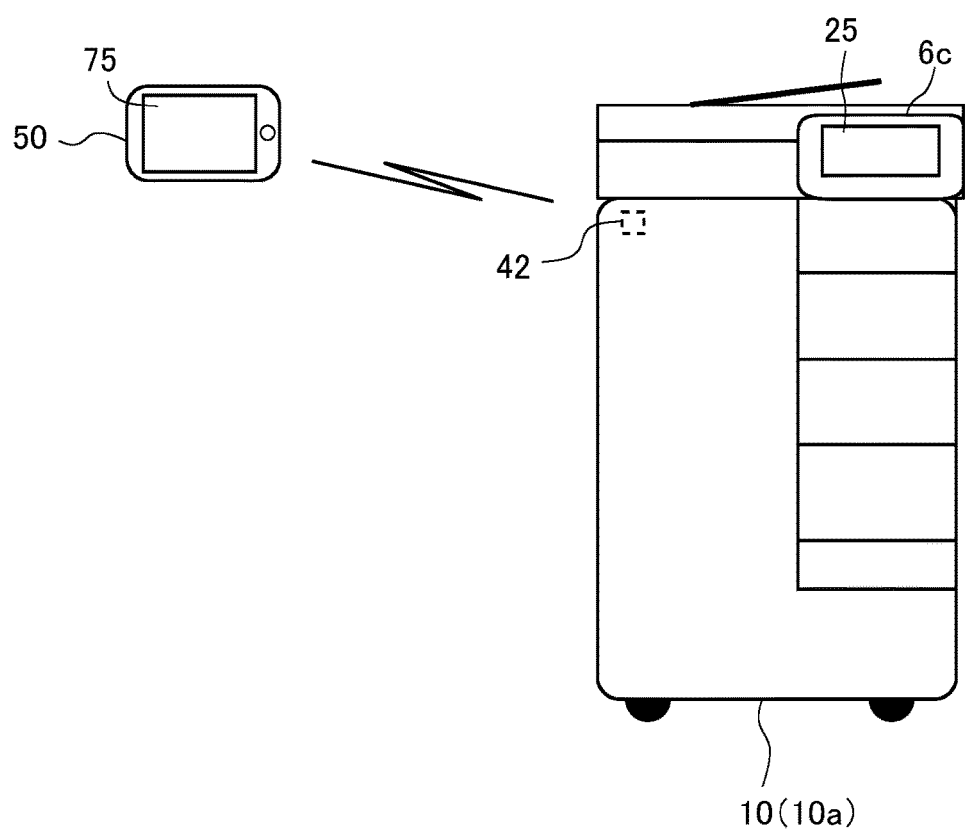
FIG. 1 is a diagram showing a communication system.

FIG. 1 is a diagram showing a communication system 1 according to the present invention. As shown in FIG. 1, the communication system 1 includes an MFP (image forming device) 10 and a mobile terminal 50. The communication system 1 is also referred to as an image forming system.

The MFP 10 and the mobile terminal 50 are connected by radio waves to each other, using various wireless communication technologies. For example, the communication between the MFP 10 and the mobile terminal can use communication by wireless LAN (IEEE 802.11 or the like) and short-range wireless communication. In the present embodiment, as the short-range wireless communication, communication using a Bluetooth (registered trade mark) system (Bluetooth communication) is used. The short-range wireless communication is not limited to the Bluetooth, and the near field radio communication (NFC) or the like may be used as the short-range wireless communication.

1-2. Configuration of Image Forming Device

Figure 2:
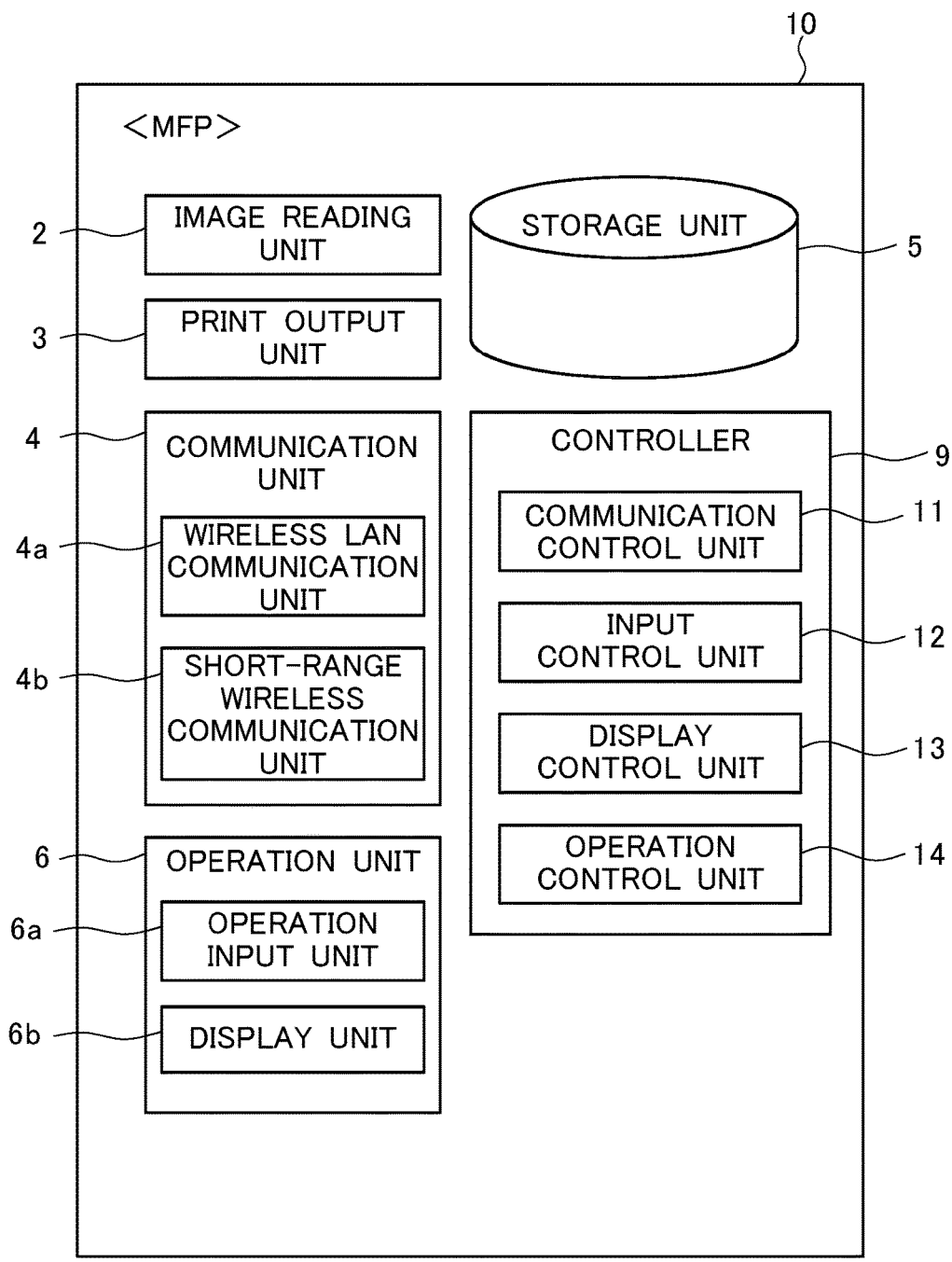
FIG. 2 is a diagram showing function blocks of an MFP (image forming device)

FIG. 2 is a diagram showing function blocks of an image forming device 10. Here, as the image forming device 10, an MFP (Multi-Functional Peripheral) is exemplified. FIG. 2 shows the function blocks of the MFP 10.

The MFP 10 is a device (also referred to as a multifunction peripheral) including a scan function, a copy function, a facsimile machine function, and a storage box function. Specifically, the MFP 10 includes, as shown in the function block diagram of FIG. 2, an image reading unit 2, a print output unit 3, a communication unit 4, a storage unit 5, an operation unit 6, a controller 9, and the like, and these units are complexly operated to realize various functions.

The image reading unit 2 is a processing unit which optically reads (in other words, scans) a document placed at a predetermined position on the MFP 10 to generate image data (also referred to as a document image or a scan image) of the document. This image reading unit 2 is also referred to as a scanning unit.

The print output unit 3 is an output unit which prints and outputs an image on various media such as a paper sheet, based on the data related to a print object.

The communication unit 4 is a processing unit which can perform facsimile communication through public lines or the like. Further, the communication unit 4 can also perform various wireless communications (including wireless communication using the Bluetooth system or other communications). Specifically, the communication unit 4 includes a wireless LAN communication unit 4a which performs wireless communication using a wireless LAN (IEEE 802.11 or the like) and a short-range wireless communication unit 4b which performs wireless communication using the Bluetooth system. In the MFP 10, there is built in a communication chip 42 (also referred to as a chip for short-range wireless communication) which functions as a part of or the whole of the short-range wireless communication unit 4b (see also FIG. 1). The communication chip 42 can transmit advertising data by broadcast. The advertising data include an identifier (for example, a MAC address (Media Access Control address or the like) of the MFP 10) for identifying the MFP 10.

The storage unit 5 is configured with a storage device such as a hard disk drive (HDD) or the like.

The operation unit 6 includes an operation input unit 6a which receives an operation input to the MFP 10; and a display unit 6b which performs display output of a variety of information.

In the MFP 10, there is provided an approximately plate-shaped operation panel unit 6c (see FIG. 1). Further, the operation panel unit 6c has a touch panel 25 on the front side (see FIG. 1). The touch panel 25 functions as a part of the operation input unit 6a and also functions as a part of the display unit 6b. The touch panel 25 is configured to have various sensors built in the liquid crystal display panel, so that the touch panel 25 can display a variety of information as well as can receive various operation inputs from an operator.

The controller 9 is a control device which is built in the MFP 10 to collectively control the MFP 10. The controller 9 is configured as a computer system equipped with a CPU, various semiconductor memories (RAM and ROM), and the like. The controller 9 realizes various processing units by executing, on the CPU, a predetermined software program (hereinafter, simply referred to as a program, too) stored in the ROM (for example, EEPROM (registered trade mark)). Note that the program (in detail, a group of program modules) may be recorded in a portable recording medium (in other words, various non-transitory computer-readable recording medium) such as a USB memory so that the program can be read out from the recording medium and can be installed in the MFP 10. Alternatively, the program may be downloaded via a network or the like to be installed in the MFP 10.

Specifically, as shown in FIG. 2, the controller 9 executes the above programs to realize various processing units including a communication control unit 11, an input control unit 12, a display control unit 13, and an operation control unit 14.

The communication control unit 11 is a processing unit which controls communication operations with other devices (the mobile terminal 50 and the like), cooperating with the communication unit 4 and the like. The communication control unit 11 has: a transmission control unit which controls a transmission operation of various data; and a reception control unit which controls a reception operation of various data.

The input control unit 12 is a control unit which controls the operation of an inputting operation to the operation input unit 6a (the touch panel 25 and the like). For example, the input control unit 12 controls the operation which receives an operation input (a designation input or the like from a user) with respect to an operation screen displayed on the touch panel 25.

The display control unit 13 is a processing unit which controls a display operation on the display unit 6b (the touch panel 25 and the like). The display control unit 13 causes the touch panel 25 to display an operation screen (remote operation screen) 200 or the like for operating the MFP 10.

The operation control unit 14 is a processing unit which controls various operations (a print output operation, a scanning operation, and the like).

1-3. Configuration of Mobile Terminal

Next, a configuration of the mobile terminal 50 will be described.

The mobile terminal 50 is a device which can perform a cooperative operation with the MFP 10 (image forming device).

Specifically, the mobile terminal 50 is an information input/output terminal device (information terminal) which can perform communication (short-range wireless communication, wireless LAN communication, and the like) with the MFP 10. Here, a tablet terminal is taken as an example of the mobile terminal 50. However, the example of the mobile terminal 50 is not limited to this, and the mobile terminal 50 may be a smartphone or the like.

Figure 3:
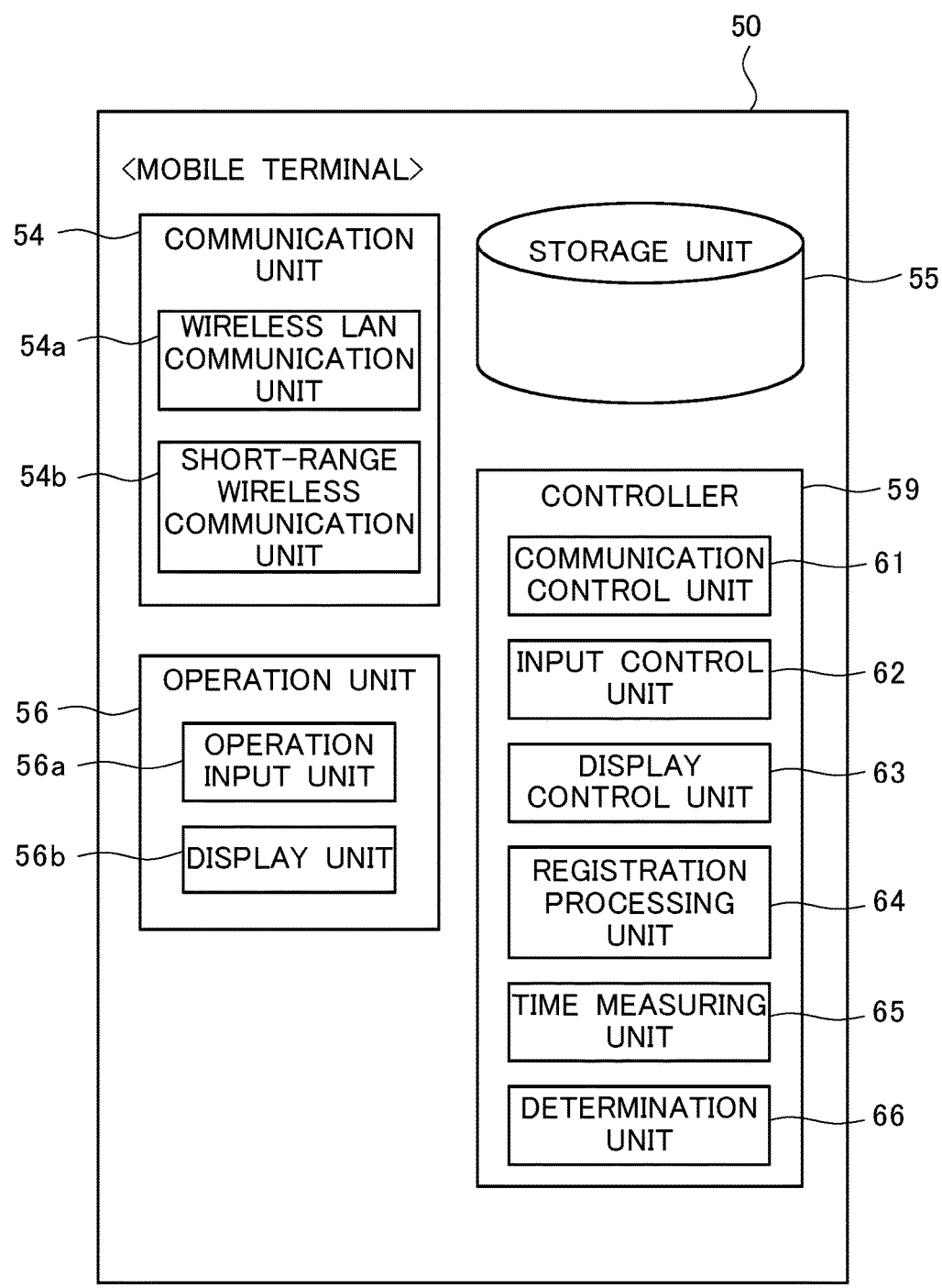
FIG. 3 is a function block diagram showing a schematic configuration of a mobile terminal.

FIG. 3 is a function block diagram showing a schematic configuration of the mobile terminal 50.

The mobile terminal 50 includes a communication unit 54, a storage unit 55, an operation unit 56, a controller 59, and the like as shown in the function block diagram of FIG. 3, and these units are complexly operated to realize various functions.

The communication unit 54 can perform various wireless communications (including wireless communication based on the Bluetooth standard and other wireless communications). Specifically, the communication unit 54 includes a wireless LAN communication unit 54a which performs the wireless communication using a wireless LAN (IEEE 802.11 or the like), and a short-range wireless communication unit 54b which performs the wireless communication using the Bluetooth.

The short-range wireless communication unit 54b receives advertising data (Advertising Data) transmitted by broadcast from the communication chip 42 built in the MFP 10, and measures an intensity of the radio wave for data transmission.

Figure 4:
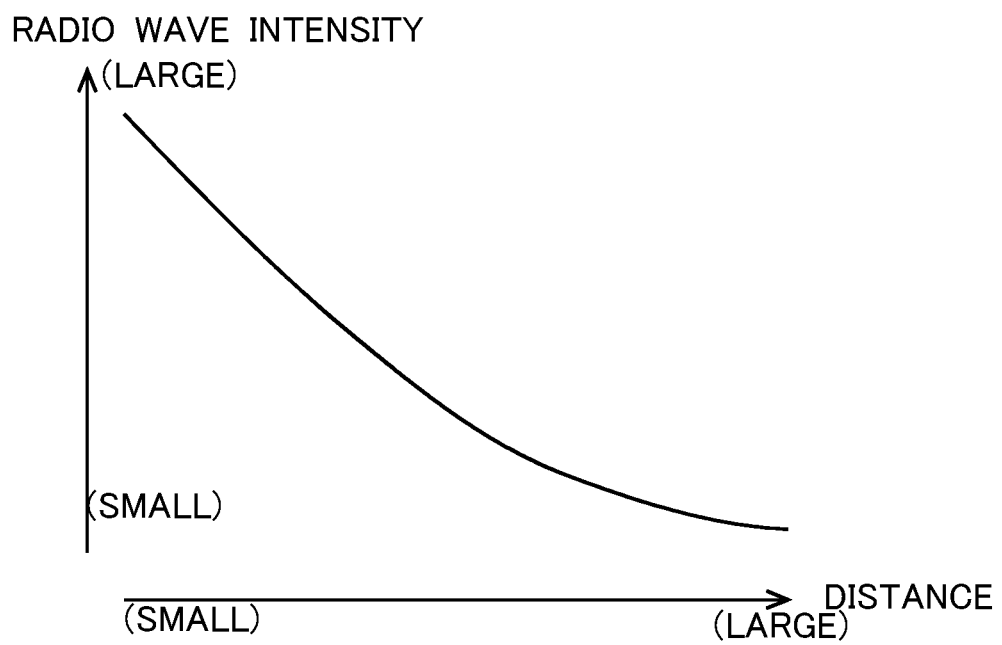
FIG. 4 is a diagram showing a relationship between a distance between a communication device and an intensity of a radio wave for wireless communication.

In the case where the mobile terminal 50 is relatively close to the MFP 10 (that is, the distance between the mobile terminal 50 and the MFP 10 is relatively small), the intensity of the radio wave (the intensity of the radio wave for the Bluetooth communication sent from the communication chip 42 in the MFP 10) detected by the mobile terminal 50 is relatively large (see FIG. 4). To the contrary, in the case where the mobile terminal 50 is relatively far from the MFP 10 (that is, the distance between the mobile terminal 50 and the MFP 10 is relatively large), the intensity of the radio wave (the intensity of the radio wave for the Bluetooth communication from the MFP 10) detected by the mobile terminal 50 is relatively small. The mobile terminal 50 can know the distance from the MFP 10 by measuring the radio wave intensity.

Further, the short-range wireless communication unit 54b performs a pairing process based on the advertising data or the like, and after the pairing process, performs normal short-range wireless communication with the pairing target device.

The wireless LAN communication unit 54a can perform wireless communication using the wireless LAN with a pairing target device by using information (an IP address or the like of the pairing target device obtained through the short-range wireless communication) obtained by the short-range wireless communication unit 54b.

The storage unit 55 is configured with a storage device such as a non-volatile semiconductor memory.

The operation unit 56 includes an operation input unit 56a which receives an operation input to the mobile terminal 50 and a display unit 56b which performs display output of a variety of information. This mobile terminal 50 is provided with a touch panel 75 in which various sensors are built in a liquid crystal display panel (see FIG. 1). This touch panel 75 functions as a part of the operation input unit 56a and also functions as a part of the display unit 56b. The touch panel 75 displays various operation screens (display screens) and the like and receives an operation input and the like on the operation screen.

The controller 59 in FIG. 3 is a control device which is built in the mobile terminal 50 and collectively controls the mobile terminal 50. The controller 59 is configured as a computer system equipped with a CPU, various semiconductor memories (RAM and ROM), and the like. The controller 59 realizes various processing units by executing, on the CPU, a predetermined software program (hereinafter, simply referred to as a program, too) stored in the storage unit 55 (non-volatile semiconductor memory or the like). The program (in detail, a group of program modules) may be recorded in a portable recording medium (in other words, various non-transitory computer-readable recording medium) such as a USB memory so that the program can be read out from the recording medium and can be installed in the mobile terminal 50. Alternatively, the program may be downloaded through a network or the like to be installed in the mobile terminal 50.

In the mobile terminal 50, there is installed a predetermined operating system (OS) 110 (see also FIG. 5), and there is also installed an application program 120 (simply referred to as an application, too) which operates on the OS 110. For example, there are installed an application (also referred to as a "printing application") for causing the MFP 10 to print various electronic documents and other applications.

Specifically, by executing the application 120 on the above OS 110, the controller 59 realizes various processing units including a communication control unit 61, an input control unit 62, a display control unit 63, a registration processing unit 64, a time measuring unit 65, and a determination unit 66.

The communication control unit 61 is a processing unit which cooperates with the communication unit 54 and the like to control the communication operation with the MFP 10 and the like.

The input control unit 62 is a control unit which controls the operation of an inputting operation to the operation input unit 56a (the touch panel 75 and the like).

The display control unit 63 is a processing unit which controls a display operation on the display unit 56b (the touch panel 75 and the like). The display control unit 63 controls, for example, display operations and the like of various display screens (201, 202, 203, and the like) (to be described later).

The registration processing unit 64 is a processing unit which performs a "pairing process" and a "device registration process". The "pairing process" is an associating process related to wireless communication using a specific method and is an associating process which previously (before normal communication by a specific method) registers communication partners in association with each other. This "pairing process" is also expressed as a preliminary registration process which previously registers the mobile terminal 50 and a device 10 on a communication destination as mutual communication partners before normal communication by a specific method. Here, as the "pairing process", an exchanging process of encryption information (encryption key information) for an encrypted communication is also performed. Further, the "device registration process" is a process for registering a device in the application 120 (the process for registering a use target device in the application 120 and other processes). Note that the "pairing process" is performed substantially by the OS 110.

The time measuring unit 65 is a processing unit which counts time. The time measuring unit 65 measures, as described later, the length of a period TM (actual time L) from time T1 to time T2 and the lengths of other periods.

The determination unit 66 is a processing unit which determines whether the pairing process by the OS 110 has been performed in the latest period TM. When the actual time L is greater than a predetermined threshold TH1, the determination unit 66 determines that the pairing process by the OS 110 has been performed in the period TM.

1-4. Operation

Figure 6:
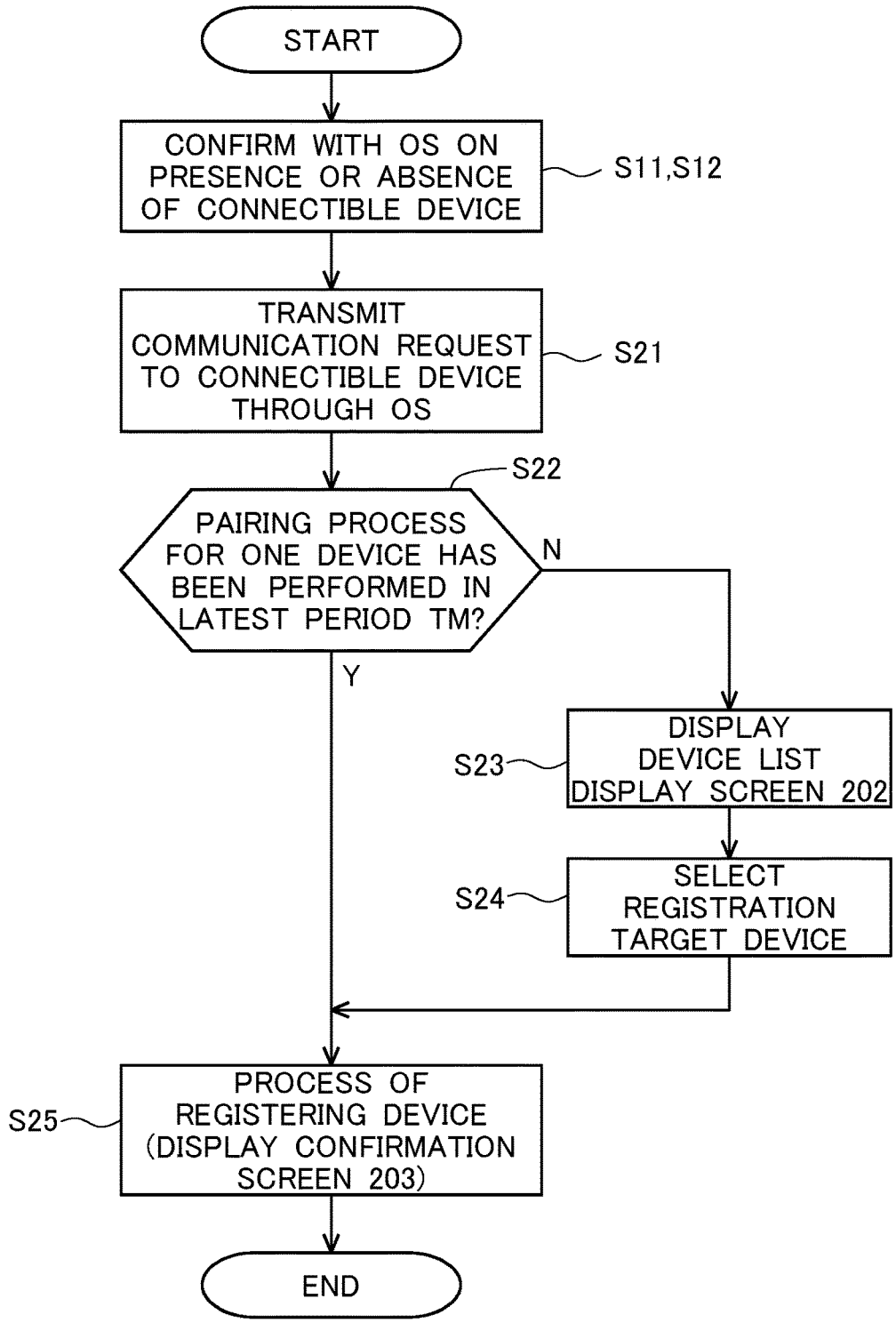
FIG. 6 is a flowchart showing an operation of the application of the mobile terminal.
Figure 7:
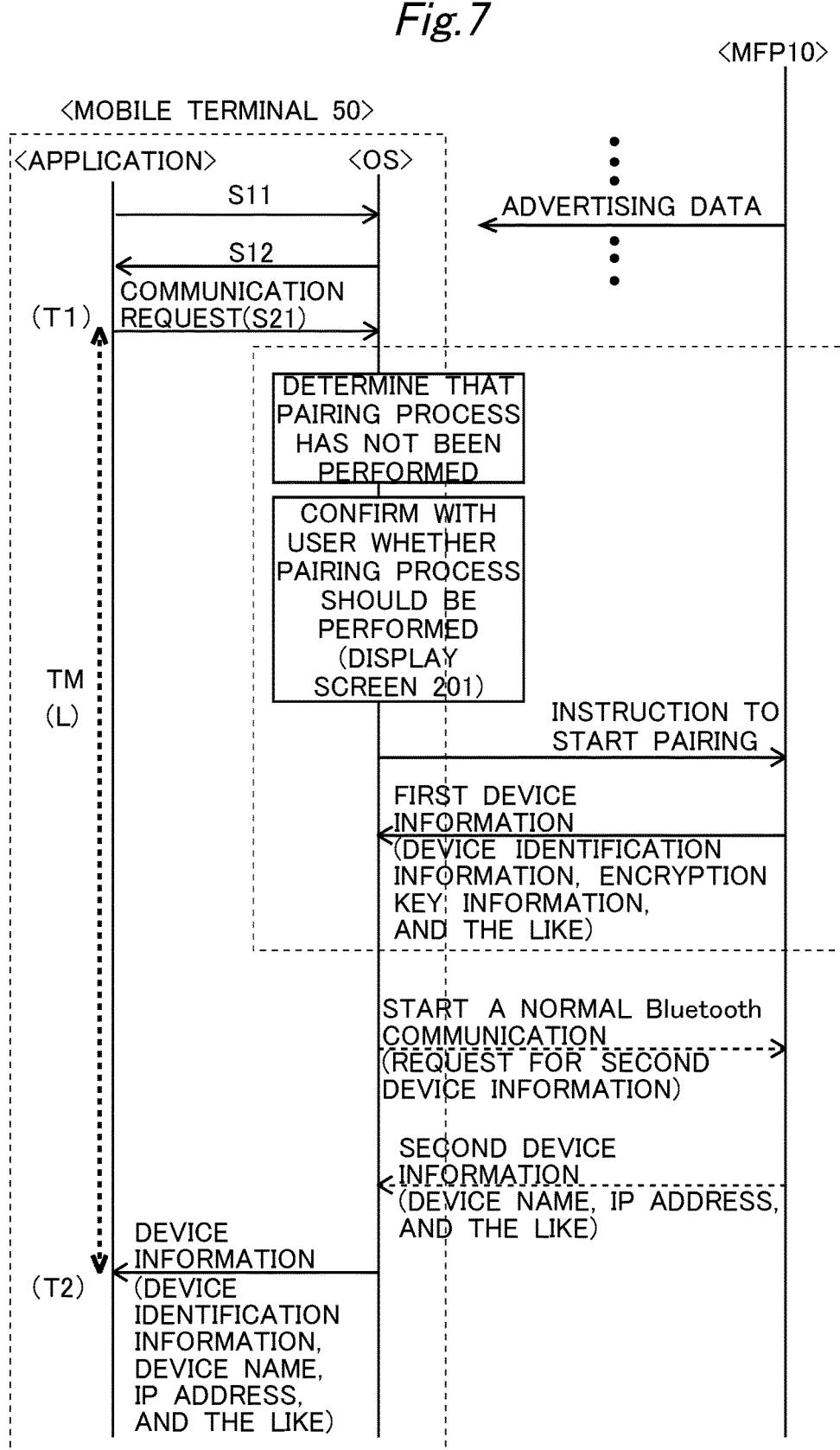
FIG. 7 is a diagram showing an operation in a case where the pairing process is performed.
Figure 8:
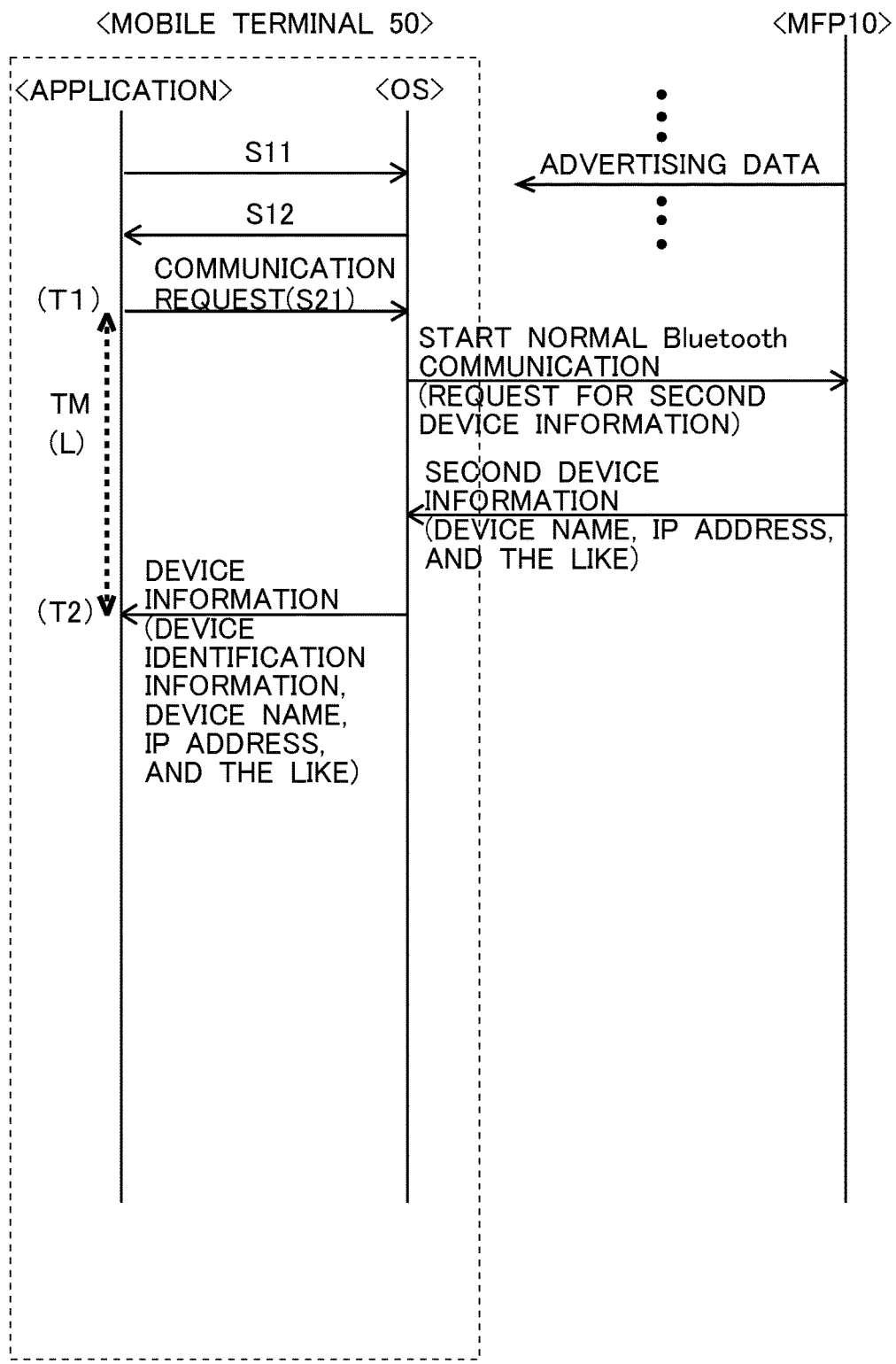
FIG. 8 is a diagram showing an operation in a case where the pairing process is not performed.

FIG. 6 is a flowchart showing an operation of the application 120 of the mobile terminal 50. Further, FIG. 7 and FIG. 8 are sequence diagrams showing operations of the respective devices in the present system 1. In more detail, FIG. 7 is a diagram showing the operation in the case where the pairing process by the OS 110 is performed, and FIG. 8 is a diagram showing the operation in the case where the pairing process by the OS 110 is not performed (in the case where the pairing has been completed in or before the previous communication and that the pairing process is not performed in the communication of this time).

The application 120 is started on the mobile terminal 50 and then performs the operation of FIG. 6.

First, in step S11 of FIG. 6, the application 120 of the mobile terminal 50 informs the OS 110 of the mobile terminal 50 of an instruction to detect a device which is sending advertising data (to be described next) (see also FIG. 7 and the like). Then, the application 120 receives the result of the detection from the OS 110 (step S12).

Here, the MFP 10 constantly sends a radio wave for communication using the Bluetooth system at fine time intervals. In detail, the communication chip 42 built in the MFP 10 (see FIG. 1) transmits advertising data by broadcast at fine time intervals. The advertising data are broadcast data transmitted by using the radio wave for short-range wireless communication (the radio wave for Bluetooth communication). The radio wave for Bluetooth communication reaches only the peripheral area (for example, about some ten centimeters to some meters) of the MFP 10.

On the other hand, the mobile terminal 50 (the OS 110, the application 120, and the like) receives the radio wave for Bluetooth communication from the MFP 10, and in addition, measures the intensity of the radio wave from the MFP 10. Specifically, when the OS 110 receives the instruction of detection from the application 120 (step S11), the OS 110 receives the advertising data being transmitted by broadcast from the communication chip 42, by using the short-range wireless communication unit 54b and the like. Further, the OS 110 obtains device identification information (the MAC address, the model name, and the like of the MFP 10) included in the advertising data. Then, the OS 110 informs the application 120 of the device identification information and the like as a detection result (step S12) (see also FIG. 7 and other drawings). Further, the application 120 cooperates with the OS 110 to obtain (measure), from the MFP 10, the intensity of the radio wave for transmitting data.

Figure 5:
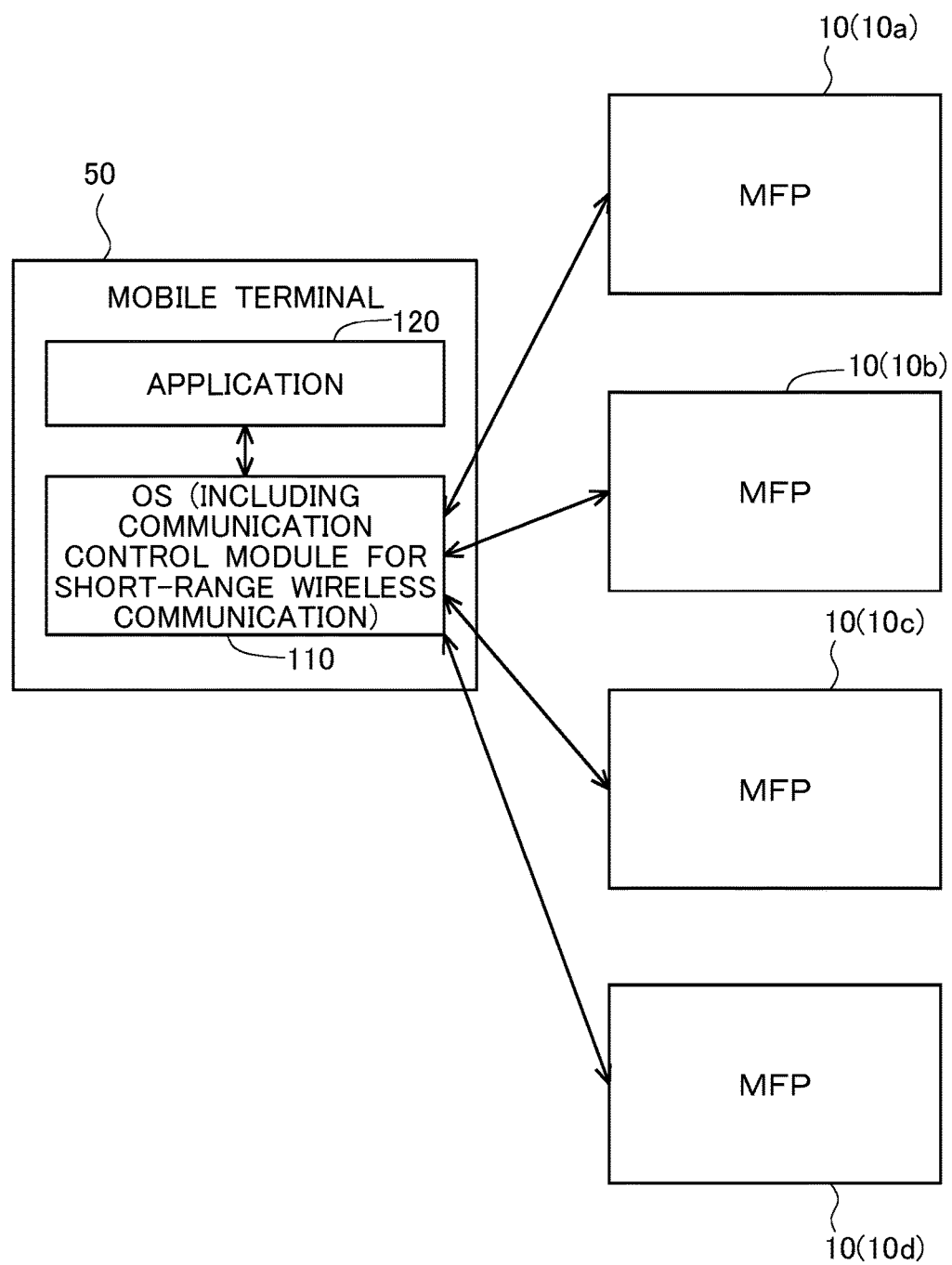
FIG. 5 is a diagram showing how an OS of the mobile terminal and an application cooperate to perform short-range wireless communication.

When there are a plurality of MFPs 10 (for example, four MFPs 10a, 10b, 10c, and 10d) in the vicinity of the mobile terminal 50, the mobile terminal 50 (the application 120) receives advertising data from the plurality of MFPs 10 (see FIG. 5). Further, the mobile terminal 50 obtains also the intensity of the radio wave from each MFP 10.

By the above operation, the application 120 obtains the "detection result" (including the information of the communicable devices (connectible devices) located in the vicinity of the mobile terminal 50) through the OS 110.

Then, in step S21, the application 120 informs the OS 110 of a "communication request" instructing to perform communication with a "detected device" (the device which has been detected to be sending the advertising data) included in the detection result (time T1). Here, a request which instructs to obtain the "device information" of the detected device through the communication with the detected device (in other words, a request for transmission of the device information of a specific device (a communication destination device)) is informed, as the "communication request," from the application 120 to the OS 110.

When a single detected device is detected in steps S11 and S12, the communication request with respect to the single detected device is informed to the OS 110 in step S21. Further, when a plurality of detected devices are detected in steps S11 and S12, the communication request with respect to each of the plurality of detected devices is informed to the OS 110 in step S21. The "communication requests" with respect to the respective devices may be parallely transmitted or may be successively (sequentially) transmitted in a certain period.

After that, the OS 110 determines whether the device (the communication destination device) to which the "communication request" is sent is already paired (step S22), and depending on the result of the determination result, the OS 110 performs different operations. These operations will be described later.

As described above, the pairing process is a process performed by the OS 110; therefore, it is usually impossible for the application 120 to get to know and to recognize, directly from the OS 110, whether the device of the communication destination is already paired. In other words, the application 120 which has issued the "communication request" to the OS 110 cannot obtain directly from the OS the information about whether the pairing process has been performed through the communication (the communication performed in response to the communication request) of this time.

In contrast, in the present embodiment, the application 120 gets to know the presence or absence (in other words, the history of the pairing process) of the execution of the pairing process, not directly from the OS 110 but by another method. Hereinafter, such a method will be described with reference to FIG. 7, FIG. 8, and other drawings.

FIG. 7 shows an operation in the case where the pairing process by the OS 110 is performed in the communication of this time (the communication currently performed based on the communication request from the application 120) (the case where the pairing process is first performed, between the MFP 10 and the mobile terminal 50, in the communication of this time and other cases). On the other hand, FIG. 8 shows an operation in the case where the pairing process by the OS 110 is not performed in the communication of this time (the case where the pairing process between the MFP 10 and the mobile terminal 50 is already completed in or before the previous communication and that the pairing process is not performed in the communication of this time, and other cases). In the case where the registered pairing information has been deleted from the mobile terminal 50 by a manual delete operation or the like, the pairing process needs to be performed again, and the pairing process as shown in FIG. 7 is performed in the "communication of this time".

First, with reference to FIG. 7, a description will be given on the operation in the case where the pairing process by the OS 110 is performed.

When the OS 110 determines that the MFP 10 (the communication destination device) related to the "communication request" is not paired (that the pairing process with respect to the communication destination device is not yet performed), the OS 110 displays, on the touch panel 75, a display screen 201 (FIG. 9) for confirming whether to permit execution of the pairing process or not.

Figure 9:
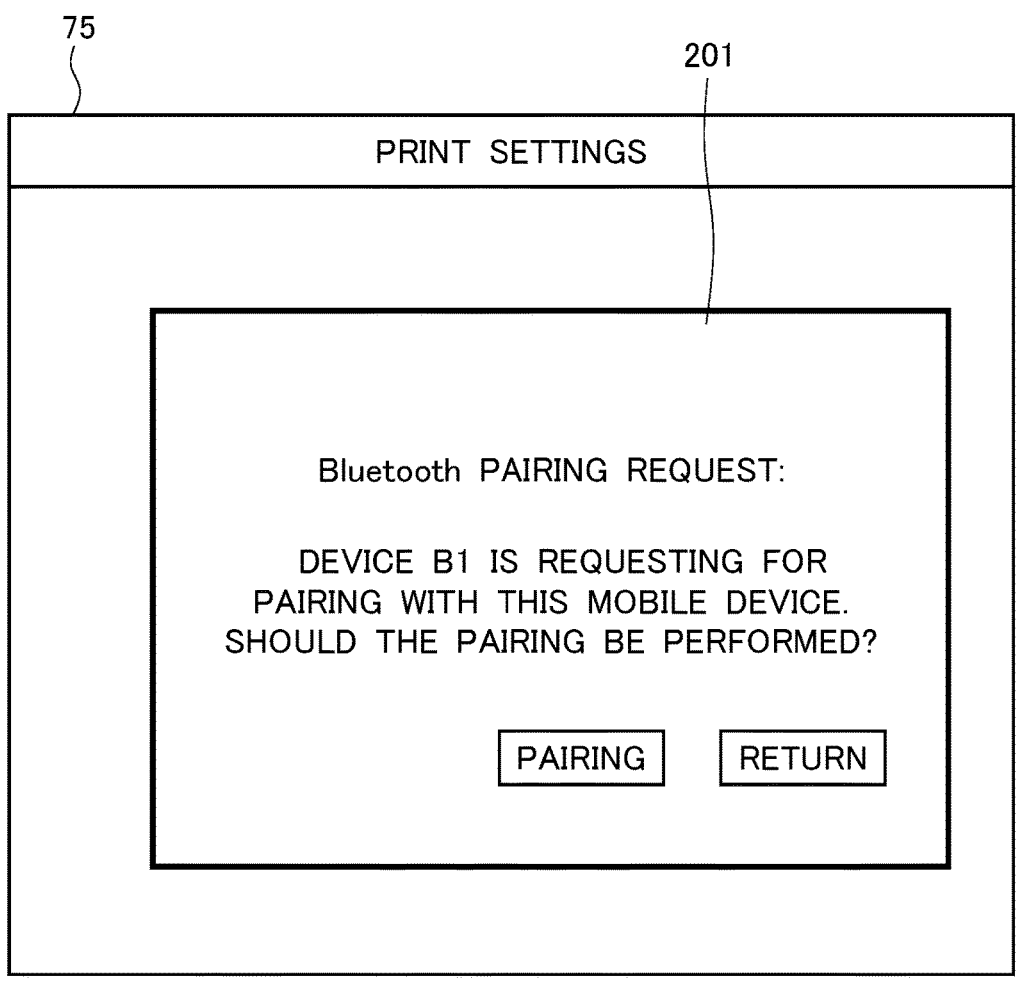
FIG. 9 is a diagram showing a dialogue screen for confirming whether the pairing process is allowed.

As shown in FIG. 9, the display screen 201 is a screen (dialogue screen) to be used to confirm whether a pairing request (in more detail, the pairing request between this mobile terminal 50 and the MFP 10 (the device of model B1)) related to the Bluetooth communication should be performed or not. A display screen by the application 120 is displayed on the background side of the dialogue screen 201, and the dialogue screen 201 is popup-displayed, by the OS 110, on the foreground side (closer side) with respect to the display screen on the background side.

When a user wants to perform pairing between the mobile terminal 50 and the MFP 10 (the device of model B1), the user of the mobile terminal 50 presses down a "Pairing" button, and if not, the user presses down a "Return" button. When the "Return" button is pressed down, the OS 110 informs the application 120 of an occurrence of an abnormal end, and the application 120 detects an occurrence of a communication abnormality (communication error) and immediately stops the process of FIG. 6 and FIG. 7.

When the "Pairing" button is pressed down by the user, the OS 110 performs the pairing process.

Specifically, the OS 110 transmits a pairing start instruction to the MFP 10 of the communication destination, and the MFP 10 sends back information for communication in response to the pairing start instruction. The OS 110 of the mobile terminal 50 and the MFP 10 perform the pairing process by exchanging a variety of information (for example, device identification information (MAC address and the like), a model name, encryption key information, and the like of each device). Through such a pairing process, the OS 110 obtains the device identification information, the model name, the information of the encryption key to be used in the Bluetooth communication, and the like of the communication destination device (the MFP 10). Further, the OS 110 stores the obtained information in a storage area under a control of the OS 110 (a storage area in the mobile terminal 50). Further, the OS 110 obtains also a device name, an IP address, and the like of the communication destination device (the MFP 10) through the Bluetooth communication immediately after the pairing is established. In the present embodiment, a relatively large volume of data such as print data is transferred from the mobile terminal 50 to the MFP 10 not by using the Bluetooth communication but by using the wireless LAN communication. The IP address obtained through the Bluetooth communication is the address (the IP address for the wireless LAN communication) to be used for the wireless LAN.

After that, the OS 110 informs the application 120 of the device information (the device identification information, the device name, the IP address, and the like of the MFP 10) obtained from the MFP 10 (time T2). This time T2 is also expressed as a receiving time of the reply information (the device information (normal reply information) through communication based on the communication request) in response to the communication request at time T1.

Next, with reference to FIG. 8, a description will be given on the operation in the case where the pairing process by the OS 110 is not performed. The operation of FIG. 8 is performed in the case where the pairing process between the MFP 10 and the mobile terminal 50 has been already completed in or before the previous communication and that the pairing process is not performed in the communication of this time.

When the OS 110 determines that the MFP 10 (the communication destination device) related to the "communication request" has been already paired, the OS 110 immediately performs the Bluetooth communication without displaying the display screen 201 (FIG. 9) on the touch panel 75 or performing the pairing process. That is, the OS 110 immediately performs the communication (the Bluetooth communication) with the mobile terminal 50 without performing the pairing process again.

Through this Bluetooth communication, the OS 110 obtains from the MFP 10 the device name, the IP address, and the like of the communication destination device (the MFP 10).

Then, the OS 110 informs the application 120 of the information obtained through the communication and/or the information (for example, the information for communication (the device identification information, the IP address, and the like of the MFP 10)) which is previously obtained from the MFP 10 (the communication destination device) and is stored on the mobile terminal 50 (time T2).

As understood from FIG. 7 and FIG. 8, after the application 120 informs the OS 110 of the communication request at time T1, the application 120 receives from the OS 110 the reply result with respect to the communication request at time T2.

However, the pairing process itself is performed by the OS 110; therefore, the application 120 cannot get to know directly from the OS 110 whether the pairing process has been performed in the period TM from time T1 to time T2. That is, the application 120 cannot get to know directly from the OS 110 the history of the pairing process by the OS (whether the pairing process has been just performed in the immediately preceding period TM).

To address this issue, in the present embodiment, the application 120 measures the actual time L from time T1 to time T2. Then, the application 120 determines whether the pairing process by the OS 110 has been performed in the period TM from time T1 to time T2, based on whether the actual time L is greater than the predetermined threshold TH1 (step S22). By this operation, the application 120 can easily get to know the presence or absence of execution of the pairing process (in other words, the history of the pairing process).

Here, as shown in FIG. 7, in the case where the pairing process is performed, the period TM is relatively long (for example, about some seconds) because a user operation using the display screen 201 (FIG. 9) is performed. In other words, since the pairing process is a process accompanied by a selection process by the user using a user interface, the period TM including the pairing process is relatively long. On the other hand, in the case where the pairing process is not performed as shown in FIG. 8, the period TM is relatively short (for example, less than one second (about some hundreds millisecond)) because a user operation using the display screen 201 is not performed.

By using such a feature, in the present embodiment, when the period TM is greater than a threshold TH1 (for example, about one to two seconds) (when the period TM is relatively long), the application 120 determines that the pairing process has been performed in the period TM. In detail, it is determined that the pairing process between the MFP 10 and the mobile terminal 50 has not been completed in or before the previous communication and that the pairing process has been performed in the communication of this time. In other words, in the case where the normal communication using the Bluetooth system is possible, it is determined that the normal communication has been made possible by the pairing process performed immediately before the communication. In short, it is determined that the short-range wireless communication connection (the Bluetooth communication connection, here) is being performed immediately after the "pairing process".

On the other hand, when the period TM is smaller than the threshold TH1 (for example, about one to two seconds) (when the period TM is relatively short), the application 120 determines that the pairing process has not been performed in the period TM. In detail, it is determined that the pairing process between the MFP 10 and the mobile terminal 50 has been already completed in or before the previous communication and that the pairing process has not been performed in the communication of this time. In other words, in the case where the normal communication by the wireless connection using the Bluetooth system is possible, it is determined that the communication has been made possible (without being accompanied by the pairing process) by the pairing process performed in or before the previous communication. In short, it is determined that the short-range wireless communication connection is being performed after the "pairing process completed long before". Note that when the period TM is equal to the threshold TH1, it may be determined that the pairing process has been performed in the period TM, or it may be determined that the pairing process has not been performed in the period TM.

By such a determination, the application 120 can easily get to know (obtain) the information about the presence or absence of execution of the pairing process (whether the pairing process has been performed in the latest period TM or not). That is, even in the case where the application 120 cannot receive the information about the presence or absence of execution of the pairing process (the information about the history of the pairing process) directly from the OS 110, the application 120 can get to know the information indirectly by the above estimation process based on the actual time L.

Further, the application 120 can reflect the information (content of determination) about the presence or absence of execution of the pairing process (the history of the pairing process) on various processes.

Hereinafter, a description will be given on an aspect in which the application 120 reflects the content of the determination about the history of the pairing process and the like on the succeeding process (specifically, reflects on the device registration process (to be described next)). Here, a process (a usable-device registering process) is exemplified as the "device registration process", in which a print output device ("usable device") which can be used in the application 120 is registered in the application 120. Note that, at least one device registered as a "usable device" is listed as a candidate for print output destinations on a "printer designation screen" (not shown).

For example, in the case where a single device 10a has been detected in steps S11 and S12 and that a communication request has been sent out to the single device 10a in step S21, the following process (the device registration process and the like) is performed.

In detail, if the above-described actual time L is smaller than the threshold TH1 with respect to one single device 10a (see FIG. 8), the application 120 determines in step S22 that the pairing process with the mobile terminal 50 has not been performed in the latest period TM and in addition performs the normal device registration process (to be described next). That is, the application 120 displays a display screen 202 of a device list (see FIG. 10) (step S23), and specifies a registration target device, based on a designation operation from the user using the display screen 202 of the device list (step S24), and then, registers the registration target device as a "usable device" (step S25).

Figure 10:
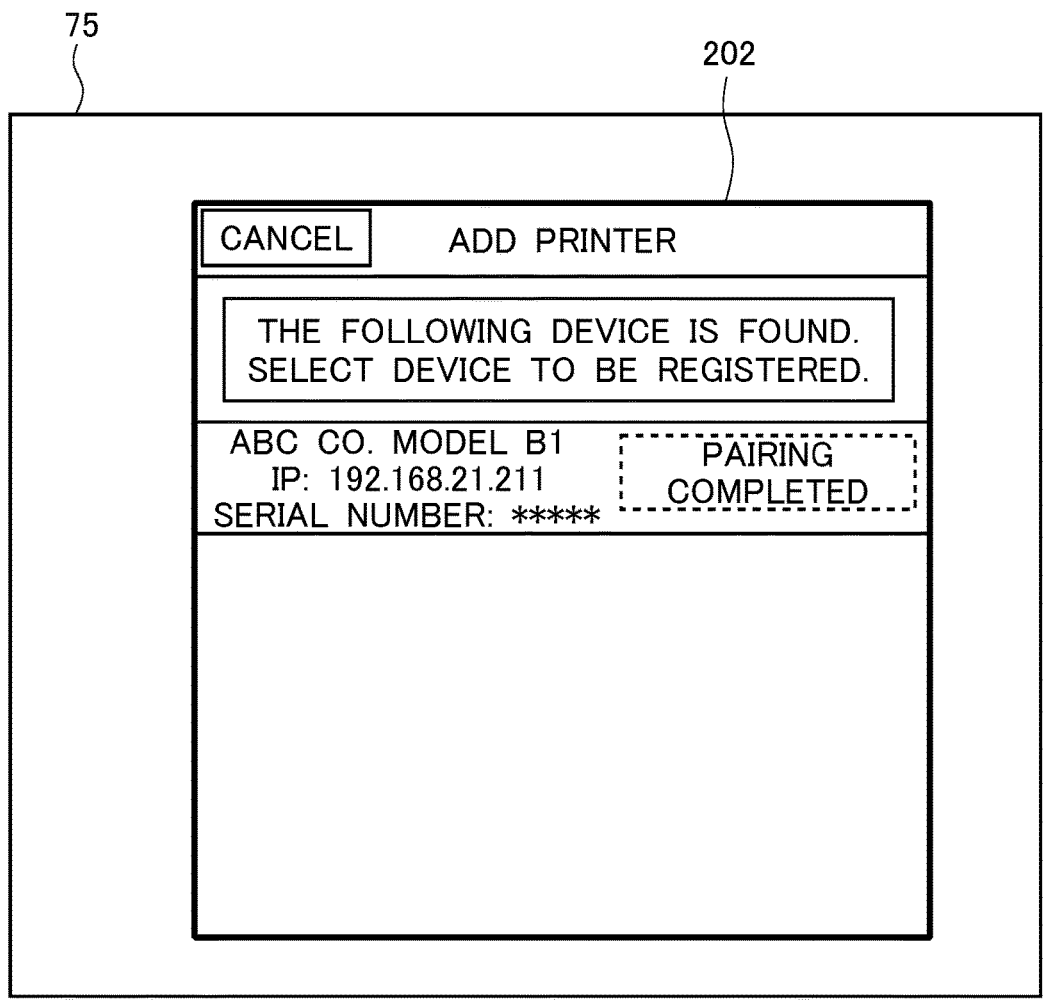
FIG. 10 is a diagram showing a device list display screen (dialogue screen)
Figure 11:
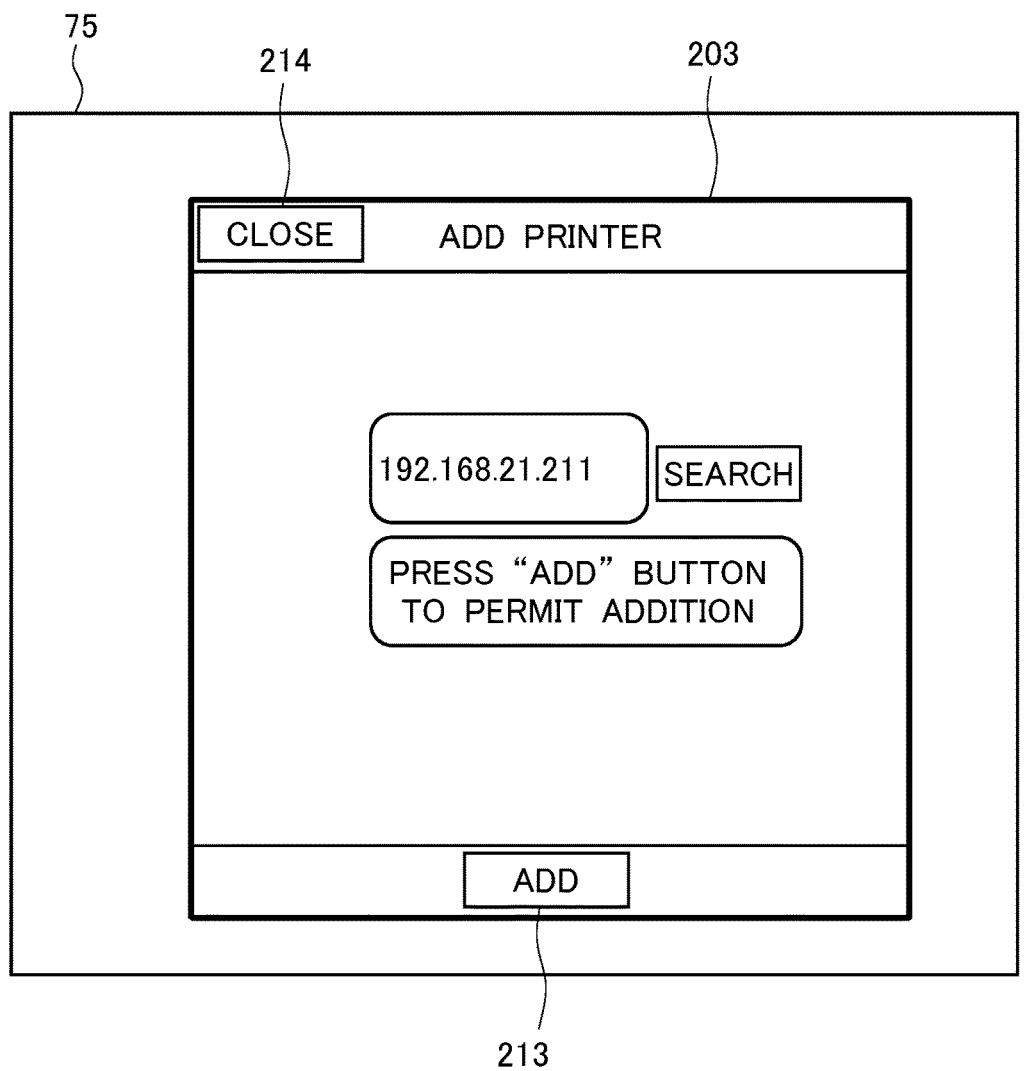
FIG. 11 is a dialogue screen for confirming whether registration of a device is allowed.

In the normal device registration process, the dialogue screen (the display screen of the device list) 202 is displayed as shown in FIG. 10 (step S23). The display screen 202 of the device list (also referred to as a device list display screen) is displayed in the application 120. On the device list display screen 202, there is listed the print output device (the MFP 10a of "model B1" here), which is detected as a device in the vicinity of the mobile terminal 50. Further, it is shown that this print output device (the MFP 10a of "model B1") is a "pairing-completed" device. If the user performs the selection operation (pushing-down operation) to select the MFP 10a of "model B1", the application 120 registers the MFP 10a as a "usable device" (steps S24 and S25). In the present embodiment, in step S25, the application 120 displays a confirmation screen 203 (FIG. 11) for confirmation, and after obtaining the approval (confirmation) of the user, the application 120 registers the device 10a as a usable device. For example, with reference to FIG. 11, if the user presses down the add button 213 on the confirmation screen 203, the application 120 determines that the user has approved, and registers the MFP 10a as a "usable device".

On the other hand, if the above-described actual time L is greater than the threshold TH1 (see FIG. 7), it is determined in step S22 (FIG. 6) that the pairing process between one device 10a and the mobile terminal 50 has been performed in the latest period TM, and an exceptional device registration process is performed. That is, the process proceeds directly to step S25 from step S22, and thus the processes in steps S23 and S24 are not performed. Specifically, the application 120 registers the device 10a as a usable device without displaying the device list display screen 202 (see FIG. 10) (step S25). In step S25, a confirmation operation using the confirmation screen 203 (FIG. 11) is performed.

When the "close" button 214 is pressed down in the confirmation screen 203, the process to register the registration target device as a usable device is interrupted. The device, with which the pairing process is completed (finished) but with which the registration process as a usable device is interrupted, is listed, on the device list display screen 202 as shown in FIG. 10, as a device (the device of model B1 in FIG. 10) which is "pairing-completed" and "not registered (as a usable device)" (which means that device registration is not completed).

Next, a description will be given on the case where a plurality of devices 10 (for example, the four MFPs 10a to 10d) are detected in steps S11 and S12 and that communication requests are sent out to the plurality of device 10 in step S21. In this case, the following process is performed.

Figure 12:
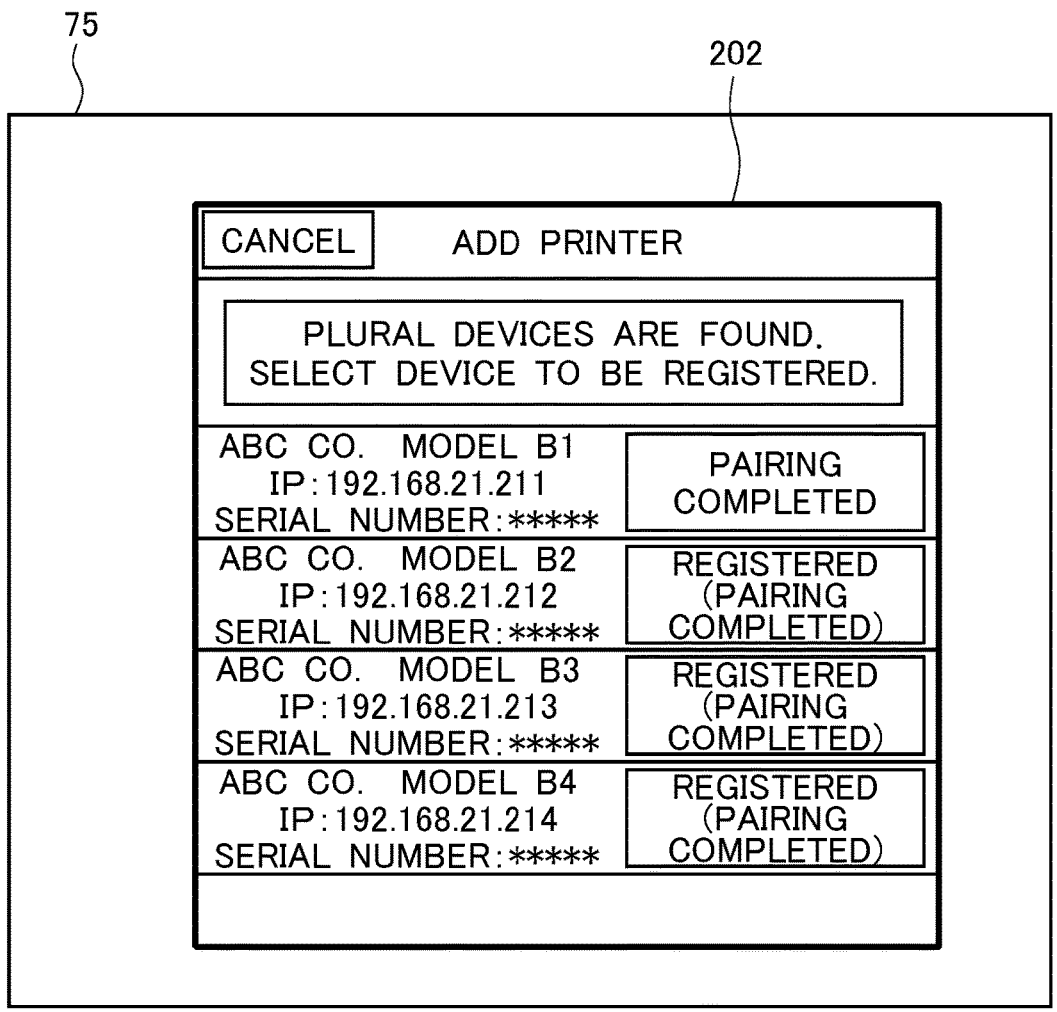
FIG. 12 is a diagram showing the device list display screen.

If it is determined that with any one of the one or the plurality of device 10 (for example, the four MFPs 10a to 10d), the pairing process with the mobile terminal 50 has not been performed in the latest period TM (step S22), the application 120 performs the normal device registration process. Specifically, the application 120 displays a device list display screen 202 (see FIG. 12) (step S23), and specifies a registration target device, based on the user's designation operation using the device list display screen 202 (step S24), and then registers the registration target device as a "usable device" (step S25). In this case, the display screen (the device list) 202 is displayed as shown in FIG. 12. The device list display screen 202 of FIG. 12 is a list for registering a "usable device" from a plurality of print output devices (the MFPs 10a to 10d) in the situation that the plurality of print output devices in the vicinity of the mobile terminal 50 are detected. The device list display screen 202 of FIG. 12 shows that the three devices (the MFPs 10b, 10c, and 10d) are "paired and registered (as "usable devices")". On the other hand, FIG. 12 shows that the remaining one device (the MFP 10a) is a device which is "paired and device-registration-not-completed". On the screen 202, for example, if the user performs the selection operation to select the MFP 10a (the device of "model B1"), the application 120 additionally registers the MFP 10a as a "usable device".

On the other hand, if it is determined that the pairing process between at least one (for example, the MFP 10a) of the one or the plurality of devices 10 (for example, the four MFPs 10a to 10d) and the mobile terminal 50 has been performed in the latest period TM, the following abnormal process is performed. Specifically, the application 120 registers the at least one device (the MFP 10a or the like) as a usable device without displaying the device list display screen 202 (see FIG. 12 and the like) (step S25). Here, for confirmation, the application 120 registers the at least one device (the MFP 10a or the like) as a usable device after displaying the confirmation screen 203 (FIG. 11) and receiving the user's confirmation (approval).

When it is determined that the pairing processes related to two or more (for example, the MFPs 10a and 10b) of the plurality of devices 10 (for example, the four MFPs 10a to 10d) have been performed in the latest period TM, the confirmation screen 203 about each of the two or more devices has only to be displayed without displaying the device list display screen 202 (see FIG. 12 and the like) immediately after each of the pairing processes with each of the two or more devices.

By the above process, the application 120 measures the actual time L from time T1 to time T2, and if the actual time L is greater than the predetermined threshold TH1 (if the period TM is relatively long), it is determined that the pairing process has been performed in the period TM. By this operation, the application 120 can get to know the information about the presence or absence of execution of the pairing process even if the application 120 cannot receive, directly from the OS 110, the information about the presence or absence of execution of the pairing process (whether the pairing process has been performed in the latest period TM or not). Thus, the application 120 can reflect the presence or absence of execution of the pairing process (the history of the pairing process) on various processes.

For example, in the above embodiment, the application 120 reflects the content of the determination about the history of the pairing process on the "device registration process". In more detail, when it is not determined that the pairing process has been performed in the period TM, a normal operation is performed. Specifically, the application 120 displays the device list display screen 202, specifies the registration target device, based on the designation operation from the user using the device list display screen 202, and registers the registration target device as a "usable device". On the other hand, when it is determined that the pairing process has been performed in the period TM, the application 120 registers the target device of the pairing process as a "usable device" without displaying the device list display screen 202. In short, the display of the device list display screen 202 is omitted. By this operation, when the pairing process has been performed in the latest period TM, the user does not have to perform the designation operation (selection operation) using the device list display screen 202 (see FIG. 10, FIG. 12, and other drawings); therefore, it is relatively easy to register the target device of the pairing process as a "usable device", whereby the operability of the user can be improved.

1-5. Others

The above embodiment describes as an example an aspect, in which the pairing process is necessary to communicate with any of the MFPs 10. However, the present invention is not limited to that example, and the plurality MFPs 10 may include both of an MFP 10 which "needs to be paired" and an MFP 10 which "does not need to be paired". The MFP 10 which "needs to be paired" is an MFP 10 which needs the pairing process (an MFP 10 which cannot communicate with the mobile terminal 50 unless the pairing process is performed at least once). Further, the MFP 10 which "does not need to be paired" is an MFP 10 which does not need the pairing process (an MFP 10 which can communicate with the mobile terminal 50 even if the pairing process is not performed). With respect to the MFP which "does not need to be paired", the device registration is possible without completion of the pairing process of the MFP.

Figure 13:
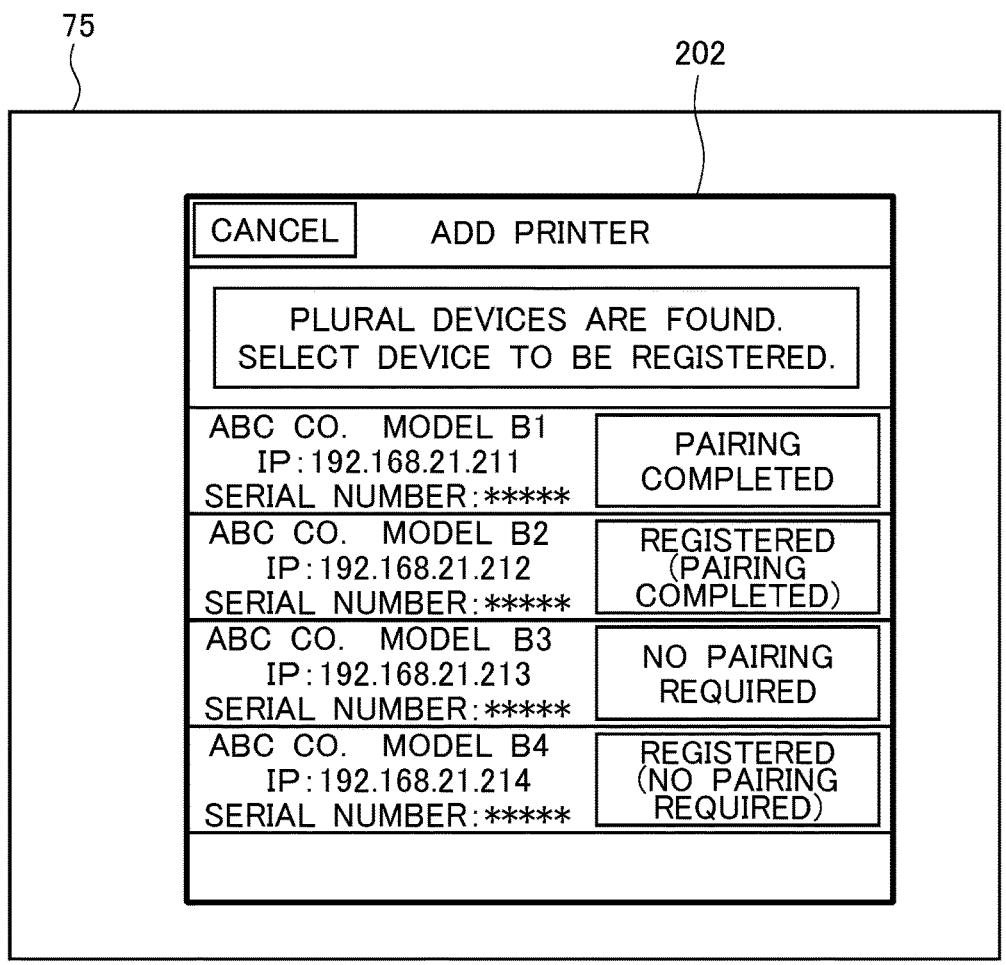
FIG. 13 is a diagram showing a device list display screen according to a modification.

In this case, instead of the device list display screen 202 as shown in FIG. 12 (see FIG. 12), the device list display screen 202 as shown in FIG. 13 may be displayed. In the device list display screen 202 of FIG. 13, the devices for which the pairing processes have been performed (the devices which need to be paired) (B1 and B2) and the devices for which the pairing processes are not performed (the devices which do not need to be paired) (B3 and B4) are displayed distinctively. In more detail, in the columns (for example, the uppermost device (model B1) and the device (model B2) just below model B1) for the devices for which the pairing processes have been completed (the devices which needs to be paired), there are displayed letters of "Pairing Completed". On the other hand, in the columns (for example, the lowermost device (model B4) and the device (model B3) immediately above model B4) for the devices for which the pairing processes are not performed (the devices which do not need to be paired), there are displayed letters of "Pairing not Required". In this manner, in the device list display screen 202 of FIG. 13, the devices (B1 and B2) which need the pairing processes and for which the pairing processes are already completed and the devices (B3 and B4) which do not need the pairing processes and for which the pairing processes are not performed are displayed distinctively.

By this operation, the user can immediately determine, on the device list display screen 202, whether each device needs to be paired or not. In more detail, for example, the device which "needs to be paired" and the device which "does not need to be paired" respectively can meet the user's demand for security in the case where the communication is performed with encryption and in the case where the communication is performed without encryption. Specifically, the user can ensure relatively high security by selecting as a "usable device" the device which "needs to be paired" (in the display column corresponding to the device, there are not written the letters of "Pairing Completed"). In other words, the user can ensure relatively high security by not selecting as a "usable device" the device which "does not need to be paired" (in the display column corresponding to the device, there are not written the letters of "Pairing Completed").

In this embodiment, the letters of "Pairing Completed" are displayed in the display columns for the devices which "need to be paired" and the letters of "Pairing Not Required" are displayed in the display columns for the devices which "do not need to be paired"; however, the present invention is not limited to this manner of display. For example, the letters of "Pairing Completed" may be displayed in the display column for the device which "needs to be paired", and the letters of "Pairing Completed" may not be displayed in the display column for the device which "does not need to be paired". In other words, by not displaying the letters of "Pairing Completed", it may be indicated that the device is "not paired" (thus, the device "does not need to be paired").

Further, in the above embodiment and the like, in the case where it is determined that the pairing process has been performed in the period TM, the application 120 performs the confirmation process using the confirmation screen 203 when registering the specific device as a "usable device" without displaying the device list display screen 202; however, the present invention is not limited to this operation. For example, if it is determined that the pairing process has been performed in the period TM, the application 120 may immediately and automatically register the specific device as a "usable device" without performing any of display process of the device list display screen 202 or the confirmation process using the confirmation screen 203.

2. Second Embodiment

The second embodiment is a modification of the first embodiment. Hereinafter, a description will be given mainly on the difference from the first embodiment.

In the above first embodiment, after it is determined, based on the magnitude relationship between the actual time L and the threshold TH1, that the pairing process has been performed in the latest period TM, the content of the determination about the presence or absence of execution of the pairing process is reflected on the "usable device registration process" (the process in the application 120 in which at least one "usable device" is registered in the application 120).

In the present second embodiment, there is exemplified an aspect in which the content of the determination about the presence or absence of execution of the pairing process is reflected on the "default device registration process". The "default device registration process" is a process in which a default device for a specific use in the application (a default device for printing (a "normally used printer") for example) is registered in the application 120.

In the present second embodiment, when it is determined that the pairing process has been performed in the period TM (step S22), the application 120 automatically registers the target device of the pairing process as a "default device".

FIG. 14 is a flowchart showing an operation of the second embodiment. The processes in steps S11, S12, and S22 of FIG. 14 is the same as those in the first embodiment (see FIG. 6).

In step S22, when it is not determined that the pairing process with at least one device has been performed in the latest period TM, the process proceeds from step S22 to step S35. That is, the current default device is not changed, and the communication is performed between the default device and the mobile terminal 50.

On the other hand, when it is determined in step S22 that the pairing process with at least one device has been performed in the latest period TM, the process proceeds to step S31.

In step S31, it is determined whether the pairing process with a single device has been performed in the latest period TM or the pairing process with a plurality of devices have been performed in the latest period TM.

When it is determined that the pairing process with a single device has been performed in the latest period TM, the process proceeds to step S34. In step S34, the application 120 automatically changes (updates) the "default device" from the device before the change to the single device (the latest paired device).

On the other hand, when it is determined that the pairing process with a plurality of devices has been performed in the latest period TM, the process proceeds to step S32. In step S32, the application 120 selects one device which has the strongest radio wave intensity (the intensity of the radio wave for wireless communication) from the plurality of devices which have been paired this time. Then, in step S33, the application 120 automatically changes (updates) the "default device" from the device before the change to the one device (the device which has the strongest radio wave intensity ((a strongest-radio-wave-intensity device))). By this process, the one device which has the strongest radio wave intensity (in other words, the device which is the closest to the mobile terminal 50 in the plurality of devices) is set as the default device; thus, the convenience of the user can be improved.

3. Modification and the Like

The embodiments of the present invention have been described in the above; however, the present invention is not limited to the embodiments whose contents are described above.

For example, in the each of the above embodiments, the MFP 10 is exemplified as the communication destination device with which the mobile terminal 50 communicates; however, the communication destination device is not limited to that, and for example, a speaker having a wireless communication function (sound output device) or the like may be the communication destination device of the mobile terminal 50. With this configuration, instead of performing, by using the MFP 10, print output related to an electronic document or the like designated by the mobile terminal 50, sound output (audio output) of the mobile terminal 50 can be performed by using the speaker.

Further, in each of the above embodiments, as the associating process (preliminary registration process) related to the specific method, the pairing process by the wireless communication using the Bluetooth (registered trade mark) is exemplified; however, the associating process is not limited to this. For example, the above-described spirit may be used in the case where an advance registration of the IP address of a wireless LAN is performed as the associating process related to the wireless LAN communication or in other cases.

While the invention has been shown and described in detail, the foregoing description is in all aspects illustrative and not restrictive. It is therefore understood that numerous modifications and variations can be devised without departing from the scope of the invention.

What is claimed is:

1. A communication device capable of performing wireless communication by a specific method, the communication device comprising:
   a time measuring unit which measures an actual time from a first timing to a second timing, the first timing being a timing at which a communication request instructing to perform communication, with a specific device, by the specific method is informed from an application program on the communication device to an operating system on the communication device, the second timing being a timing at which reply information in response to the communication request is informed from the operating system to the application program; and
   a determination unit which determines whether an associating process relating to the wireless communication by the specific method has been performed by the operating system in a specific period from the first timing to the second timing, the associating process previously registering the communication device and the specific device in association with each other,
   wherein
   when the actual time is greater than a predetermined threshold, the determination unit determines that the associating process has been performed in the specific period, and
   when the actual time is smaller than the predetermined threshold, the determination unit determines that the associating process has not been performed in the specific period.

2. The communication device according to claim 1, further comprising:
   a registration unit which performs a device registration process which registers in the application program a usable device which is a device usable in the application program,
   wherein
   when the determination unit determines that the associating process has not been performed in the specific period, the registration unit displays a list in which at least one registerable device is listed, specifies a registration target device based on a designation operation from a user using the list, and registers the registration target device as the usable device, and
   when the determination unit determines that the associating process has been performed in the specific period, the registration unit does not display the list and registers the specific device as the usable device.

3. The communication device according to claim 2, wherein the registration unit distinctively displays, in the list, a device which needs the associating process and for which the associating process is already completed and a device which does not need the associating process and for which the pairing process is not performed.

4. The communication device according to claim 1, further comprising:
   a registration unit which performs a device registration process which registers in the application program a usable device which is a device usable in the application program,
   wherein when the determination unit determines that the associating process has been performed in the specific period, the registration unit automatically registers the specific device as the usable device.

5. The communication device according to claim 1, further comprising:
   a registration unit which performs a default device registration process which registers in the application program a default device for a specific use in the application program,
   wherein when the determination unit determines that the associating process has been performed in the specific period, the registration unit automatically registers the specific device as the default device.

6. The communication device according to claim 5, wherein when the determination unit determines that the communication request related to each of a plurality of devices has been sequentially or parallelly transmitted in a predetermined period and that the associating process related to each of the plurality of devices has been performed in the specific period, the registration unit automatically registers, as the default device, a device which has the strongest intensity of a radio wave for wireless communication in the plurality of devices.

7. The communication device according to claim 1, wherein the communication by the specific method is wireless communication based on a Bluetooth standard.

8. A non-transitory computer-readable recording medium storing an application program for causing a computer built in a communication device capable of performing wireless communication by a specific method to execute:
 (a) measuring an actual time from a first timing to a second timing, the first timing being a timing at which a communication request instructing to perform communication, with a specific device, by the specific method is informed from an application program on the communication device to an operating system on the communication device, the second timing being a timing at which reply information in response to the communication request is informed from the operating system to the application program; and
 (b) determining whether an associating process relating to the wireless communication by the specific method has been performed by the operating system in a specific period from the first timing to the second timing, the associating process previously registering the communication device and the specific device in association with each other,
 wherein in step (b),
 when the actual time is greater than a predetermined threshold, it is determined that the associating process has been performed in the specific period, and
 when the actual time is smaller than the predetermined threshold, it is determined that the associating process has not been performed in the specific period.

9. The non-transitory computer-readable recording medium according to claim 8, wherein the application program causes the computer to further execute:
 (c) performing a device registration process which registers in the application program a usable device which is a device usable in the application program,
 wherein step (c) includes:
  (c-1) in a case where it is determined, in step (b), that the associating process has not been performed in the specific period, registering the usable device using a list in which at least one registerable device is listed; and
  (c-2) in a case where it is determined, in step (b), that the associating process has been performed in the specific period, registering the specific device as the usable device without displaying the list, and step (c-1) includes:
 (c-1-1) displaying the list;
  (c-1-2) specifying a registration target device, based on a designation operation from a user using the list; and
  (c-1-3) registering the registration target device as the usable device.

10. The non-transitory computer-readable recording medium according to claim 9, wherein the list distinctively displays a device which needs the associating process and for which the associating process is already completed and a device which does not need the associating process and for which the pairing process is not performed.

11. The non-transitory computer-readable recording medium, according to claim 8, wherein the application program causes the computer to further execute:
 (c) performing a device registration process which registers in the application program a usable device which is a device usable in the application program,
 wherein in step (c), in a case where it is determined that the associating process has been performed in the specific period, the specific device is automatically registered as the usable device.

12. The non-transitory computer-readable recording medium, according to claim 8, wherein the application program causes the computer to further execute:
 (d) performing a default device registration process which registers in the application program a default device for a specific use in the application program,
 wherein in step (d), in a case where it is determined that the associating process has been performed in the specific period, the specific device is automatically registered as the default device.

13. The non-transitory computer-readable recording medium according to claim 12, wherein in step (d), in a case where it is determined that the communication request related to each of the plurality of devices has been sequentially or parallely transmitted in a predetermined period and that the associating process related to each of the plurality of devices has been performed in the specific period, a device which has the strongest intensity of a radio wave for wireless communication in the plurality of devices is automatically registered as the default device.

14. The non-transitory computer-readable recording medium according to claim 8, wherein the communication by the specific method is wireless communication based on a Bluetooth standard.

15. A communication system comprising:
 a first communication device: and
 at least one communication destination device which is a communication destination of the first communication device,
 wherein
 the first communication device is a communication device which can perform wireless communication by a specific method, and
 the first communication device includes:
  a time measuring unit which measures an actual time from a first timing to a second timing, the first timing being a timing at which a communication request instructing to perform communication, with a specific device, by the specific method is informed from an application program on the communication device to an operating system on the communication device, the second timing being a timing at which reply information in response to the communication request is informed from the operating system to the application program; and
  a determination unit which determines whether an associating process relating to the wireless communication by the specific method has been performed by the operating system in a specific period from the first timing to the second timing, the associating process previously registering the communication device and the specific device in association with each other,
 when the actual time is greater than a predetermined threshold, the determination unit determines that the associating process has been performed in the specific period, and when the actual time is smaller than the predetermined threshold, the determination unit determines that the associating process has not been performed in the specific period.

\* \* \* \* \*